United States Patent
Funke

(10) Patent No.: US 6,943,848 B2
(45) Date of Patent: Sep. 13, 2005

(54) UNIT FOR AND METHOD OF VIDEO SIGNAL ENHANCEMENT AND IMAGE DISPLAY APPARATUS PROVIDED WITH SUCH A VIDEO SIGNAL ENHANCEMENT UNIT

(75) Inventor: Eric Peter Funke, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 506 days.

(21) Appl. No.: 10/086,880

(22) Filed: Mar. 1, 2002

(65) Prior Publication Data

US 2002/0171772 A1 Nov. 21, 2002

(30) Foreign Application Priority Data

Mar. 6, 2001 (EP) .............................................. 01200840

(51) Int. Cl.$^7$ ................................................. H04N 5/52
(52) U.S. Cl. ....................... 348/678; 348/603; 348/625; 348/673
(58) Field of Search ................................ 348/603, 625, 348/673, 678; H04N 5/52

(56) References Cited

U.S. PATENT DOCUMENTS

| | | | | |
|---|---|---|---|---|
| 5,422,680 A | * | 6/1995 | Lagoni et al. | 348/674 |
| 5,808,697 A | * | 9/1998 | Fujimura et al. | 348/672 |
| 5,995,161 A | * | 11/1999 | Gadre et al. | 348/564 |
| 6,285,413 B1 | * | 9/2001 | Akbayir | 348/678 |
| 6,600,519 B1 | * | 7/2003 | Hwang | 348/673 |
| 6,809,776 B1 | * | 10/2004 | Simpson | 348/565 |

* cited by examiner

Primary Examiner—Brian P. Yenke

(57) ABSTRACT

A video signal enhancement unit (100) and an image display apparatus containing the unit have a processing unit (102) for contrast modification of the video signal. The processing unit (102) receives input data from a contrast counter (112), designed to store a contrast count. The contrast count is decreased by a pixel counter (104) each time the total number of pixels which have video signal levels that are higher than a predetermined video level, exceeds a predefined threshold. The contrast count is increased each time a trigger means (114) generates a pulse. A contrast comparator (116) can be coupled to the contrast counter (112) to limit the contrast count to a maximum contrast value.

10 Claims, 3 Drawing Sheets

UNIT FOR AND METHOD OF VIDEO SIGNAL ENHANCEMENT AND IMAGE DISPLAY APPARATUS PROVIDED WITH SUCH A VIDEO SIGNAL ENHANCEMENT UNIT

BACKGROUND OF THE INVENTION

1. Field of the Invention

The invention relates to a video signal enhancement unit comprising:

a pixel counter for generating a count of pixels representative of the number of pixels that occur within a predetermined period of time and which have video signal levels that are higher than a predetermined video level, and a processing unit for modifying contrast of the video signal in dependence on the count of pixels.

The invention further relates to an image display apparatus provided with:

receiving means for receiving a video signal;

a display device for displaying images represented by the video signal; and a video signal enhancement unit comprising:

a pixel counter for generating a count of pixels representative of the number of pixels that occur within a predetermined period of time and which have video signal levels that are higher than a predetermined video level, and a processing unit for modifying contrast of the video signal in dependence on the pixel count.

The invention further relates to a method of video signal enhancement comprising:

generating a count of pixels representative of the number of pixels that occur within a predetermined period of time and which have video signal levels that are higher than a predetermined video level; and modifying contrast of the video signal in dependence on the count of pixels.

2. Description of the Related Art

A unit of the kind described in the opening paragraph is known from U.S. Pat. No. 5,422,680.

In this unit, the amplitude range of the picture signal can be divided into a number of histogram segments, whereafter, it is determined, by means of a measurement per histogram segment, how often a pixel value, or how long the picture signal, occurs with an amplitude in the relevant histogram segment. Subsequently, the picture signal is processed by a non-linear unit having a transfer characteristic based on the integral of the histogram, i.e., per histogram segment, the picture signal is amplified by a factor which depends on the contents of the relevant measured histogram segment.

A drawback of the unit is that it requires relatively many elements per histogram segment, i.e., pixels, in order to determine an accurate transfer characteristic. This results in a delay of at least one field. Other disadvantages of this unit are its complexity and its costs. Analyzing the video signal, storing several intermediate results, i.e., a histogram, and calculating a transfer characteristic based on the histogram, requires relatively many components.

SUMMARY OF THE INVENTION

It is a first object of the invention to provide a video signal enhancement unit of the kind described in the opening paragraph that has a relatively fast time response.

It is a second object of the invention to provide an image display apparatus comprising such a video signal enhancement unit.

It is a third object of the invention to provide a method of video signal enhancement of the kind described in the opening paragraph resulting in a relatively fast time response.

The first object of the invention is achieved in that the video signal enhancement unit is characterized in that instead of the predetermined period of time, a time period during which the count of pixels is determined, is a number of times shorter than one video field interval.

Because this period of time is relatively short, the pixel counter can already start to generate control pulses for contrast modification after having analyzed only a portion of a video field. The latency is less than one video field. The video signal is taken to the desired level in a period of time that is hardly noticeable by the observer of the images, represented by the video signal. In the prior art, a longer period of time is used in order to have more data to control the processing, which might be more accurate. Another advantage of the video signal enhancement unit according to the invention, is that it can be made with relatively few components, e.g., standard components like an EPLD (Erasable Programmable Logic Device).

An embodiment of the video signal enhancement unit according to the invention compriss:

a contrast counter for providing a control input for the processing unit, and for storing a contrast count that is decreased each time the count of pixels exceeds a predefined threshold; and a trigger means, connected to the contrast counter, for generating a pulse, resulting in an increase of the contrast count.

The contrast counter is a kind of integrator that stabilizes the contrast modifications to be applied. The current state of the video signal enhancement unit is based on results from previous analyses of pixel values and on previous contrast increase pulses. The transition to a next state is based on the current state and on the analyses of pixel values as performed in the last period of time, or on the most recent contrast increase pulse.

In an embodiment of the video signal enhancement unit according to the invention, comprising a contrast counter and trigger means, the trigger means generates a pulse every video field. The trigger means generates contrast increase pulses independent from the operation of the pixel counter. The result is that the two controls, i.e., pixel counter for contrast decrease and trigger means for contrast increase, are de-correlated. The trigger means generates contrast increase pulses synchronized with the displaying of video fields. The frequencies of displaying fields and generating contrast increase pulses are mutual equal.

Another embodiment of the video signal enhancement unit according to the invention, is characterized in that the video signal enhancement unit further comprises a second pixel counter for generating a second count of pixels representative of a second number of pixels that have video signal levels that are higher than a second predetermined video level, and characterized in that the trigger means generates the pulse if the second count of pixels is less than a second predefined threshold. The generation of contrast increase pulses is then determined by the second pixel count. That means that the generation of contrast increase pulses is conditional. Typically, the second predetermined video level is less than the predetermined video level, .e.g., 5–10% less. Based on comparing the second count of pixels with the second predefined threshold, it is decided whether a contrast increase pulse should be generated. The result is a kind of hysteresis in the function describing the control of the contrast based on the video signal levels, i.e., the contrast is decreased if the count of pixels is higher than the predetermined threshold, the contrast is increased if the second count of pixels is less than the second predetermined threshold, and the contrast remains unchanged if it appears that no contrast change is required. An advantage of this embodiment according to the invention is that a relatively stable control of contrast is achieved. This is particular of interest in the case of interlaced video. In that case, it is possible that corresponding fields of one frame as received, differ in video signal level to such an extent that different amounts of contrast enhancement could be applied, causing a flicker. With this embodiment of the video signal enhancement unit according to the invention, the contrast of both fields of one frame will be enhanced substantially equal.

An embodiment of the video signal enhancement unit according to the invention comprises, coupled to the contrast counter, a contrast comparator to limit the contrast count to a maximum contrast value. To prevent saturation of cathodes or blooming on Cathode Ray Tubes (CRTs) or even overloading of power supplies, the video signal should not be amplified too much. In the case of Plasma Display Panels (PDPs), a too much amplified video signal can result in clipping, i.e., pixels are displaying the maximum possible luminance value.

In an embodiment of the video signal enhancement unit according to the invention, the maximum contrast value is controllable. This embodiment comprises means for controlling the maximum amplification, i.e., contrast modification. It might be that the various users of the video signal enhancement unit have different preferences concerning optimal video enhancement.

An embodiment of the video signal enhancement unit according to the invention comprises a contrast comparator that controls the trigger means to stop generating pulses when the contrast count has reached the controllable maximum contrast value. When the contrast count has reached that level, it is of no use to continue with generating pulses.

The second object of the invention is achieved in that the image display apparatus is provided with a video signal enhancement unit being characterized in that the period of time, during which the count of pixels is determined, is a number of times shorter than one video field interval.

The third object of the invention is achieved in that with the method of video signal enhancement the period of time, during which the count of pixels is determined, is a number of times shorter than one video field interval.

BRIEF DESCRIPTION OF THE DRAWINGS

These and other aspects of the video signal enhancement unit and of the image display apparatus according to the invention will become apparent from and will be elucidated with reference to the implementations and embodiments described hereinafter, and with reference to the accompanying drawings, wherein.

DESCRIPTION OF THE PREFERRED EMBODIMENTS

Figure 1:
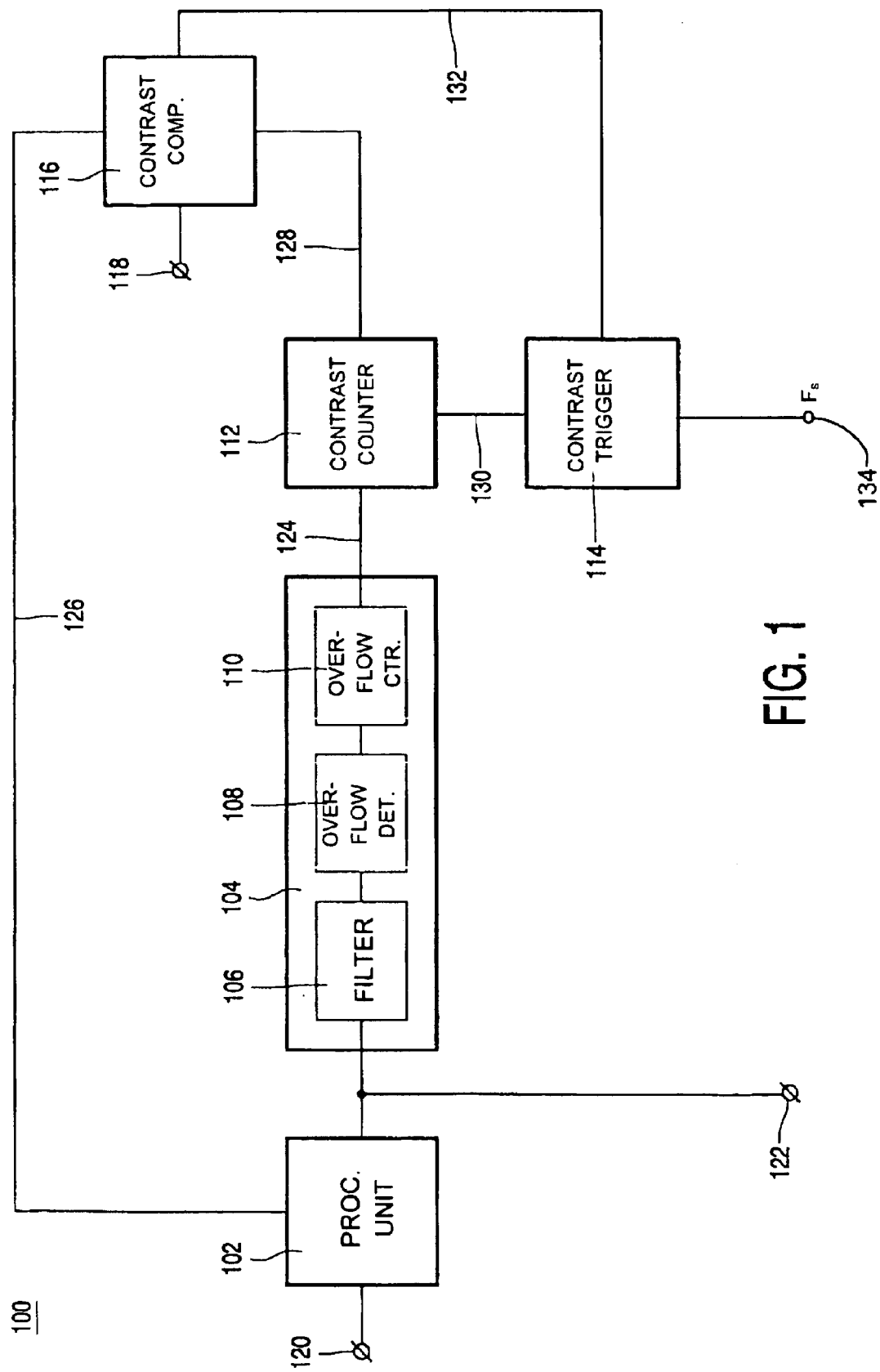
FIG. 1 schematically shows an embodiment of the video signal enhancement unit.

FIG. 1 schematically shows an embodiment of the video signal enhancement unit 100. The video signal enhancement unit 100 comprises a pixel counter 104 for generating a count of pixels representative of the number of pixels that have video signal levels higher than a predetermined video level, a processing unit 102 for modifying contrast of the video signal in dependence on the count of pixels, a contrast counter 112 for providing a control input for the processing unit 102, and for storing a contrast count that is decreased each time the count of pixels exceeds a predefined threshold, a trigger means 114 for generating a pulse in order to increase the contrast count, and a contrast comparator 116 for limiting the contrast count to a maximum contrast value.

The data flow through and control signals of the signal enhancement unit 100 are described below. The video signal enters the video signal enhancement unit 100 at the input connector 120. The processing unit 102 multiplies the incoming video signal with a gain that is linearly related to the contrast count 126, that is between 1 and a controllable maximum contrast value, CM. The output of the video signal enhancement unit 100 is an enhanced video signal, i.e., with a modified contrast. The video signal enhancement unit 100 provides the output on the connector 122. The controllable maximum contrast value is stored in the contrast comparator 116, which can be optional, and can be adjusted via the input 118 of the contrast comparator 116. The video signal is analyzed by the pixel counter 104. The pixel counter 104 comprises a filter 106, an overflow detector 108 and an overflow counter 110. The filter 106 filters the video signal to extract only those parts from the video signal that represent valid pixels. The overflow detector 108 detects whether the value of the current pixel exceeds a predefined pixel level threshold, $PL_{th}$, and generates a pulse each time that this occurs. The overflow counter 110 counts the pulses generated by the overflow detector 108. The overflow counter 110 holds the count of pixels. When the count of pixels exceeds a preselected count of pixels threshold, $CP_{th}$, the overflow counter 110 resets and gives a contrast decrease pulse 124 to the contrast counter 112. The contrast counter 112 holds the value of the contrast count 128, CC, and provides this value to the contrast comparator 116. So, every P pixels, with P larger than the count of pixels threshold, $CP_{th}$, with a pixel value higher than the pixel level threshold, $PL_{th}$, the contrast count, CC, is decreased. In pseudo language, this can be expressed as:

if $PL > PL_{th}$ then $CP := CP + 1$;      (1)

if $CP > CP_{th}$ then $\{CC := CC - 1; := CP := 0;\}$      (2)

The trigger means 114 is arranged to generate a contrast increase pulse 130 at the beginning of every video field. To that end, the trigger means 114 receives a vertical synchronizing signal PS at input 134 of the video signal applied to input connector 120 This contrast increase pulse 130 is taken by the contrast counter 112, which adapts the contrast count 126 accordingly. In pseudo language, this can be expressed as:

$$\text{if } (t == t0 + k * T_{field}) \text{ then } CC := CC + \text{DeltaC}; \tag{3}$$

Note that the absolute value of the contrast increase caused by a contrast increase pulse 130 might differ from the absolute value of the contrast decrease caused by a contrast decrease pulse 124. In equation notation: DeltaC≠1.

When the contrast comparator 116 detects that the contrast count 128 is at the level of the controllable maximum contrast value, CM, then the contrast comparator 116 controls the trigger means 114 to stop generating contrast increase pulses 130. This control is arranged via connection 132 between the contrast comparator 116 and the trigger means 114. Expression 3 should be rewritten as:

$$\text{if } (t == t0 + k * T_{field} \text{ \&\& } CC < CM) \text{ then } CC := CC + \text{DeltaC}; \tag{4}$$

When the contrast count is below a predefined threshold, the contrast comparator 116 controls the trigger means 114 to again start generating increase pulses 130.

The dynamic behavior of the video signal enhancement unit 100, i.e., the process of contrast modification can be explained with the following use-case. Suppose all pixels are below $PL_{th}$. Then the count of pixels will never exceed the count of pixels threshold, $CP_{th}$, and consequently the overflow counter 110 will never give a contrast decrease pulse 124 to the contrast counter 112. However, as long as the maximum contrast value is not yet reached, every field, $t = t0 + k * T_{field}$, the trigger means 114 generates a contrast increase pulse 130. The result is that the contrast of the video signal is enhanced. This process of increasing the contrast continues until the level of the video signal, i.e., pixel levels, start exceeding the pixel level threshold, $PL_{th}$. Then, the overflow detector 108 starts generating pulses, and eventually, the overflow counter 110 will give contrast decrease pulses 124 to the contrast counter 112. At that moment, the video signal enhancement unit 100 reaches the equilibrium state, i.e., the contrast decrease pulses in one field match the contrast increase pulse per field. Note that a contrast decrease pulse 124 will only be generated in case of overflow. It might be, e.g., in the case of a dark scene and a low maximum contrast value, that the pixel level threshold, $PL_{th}$ is never exceeded.

Figure 2:
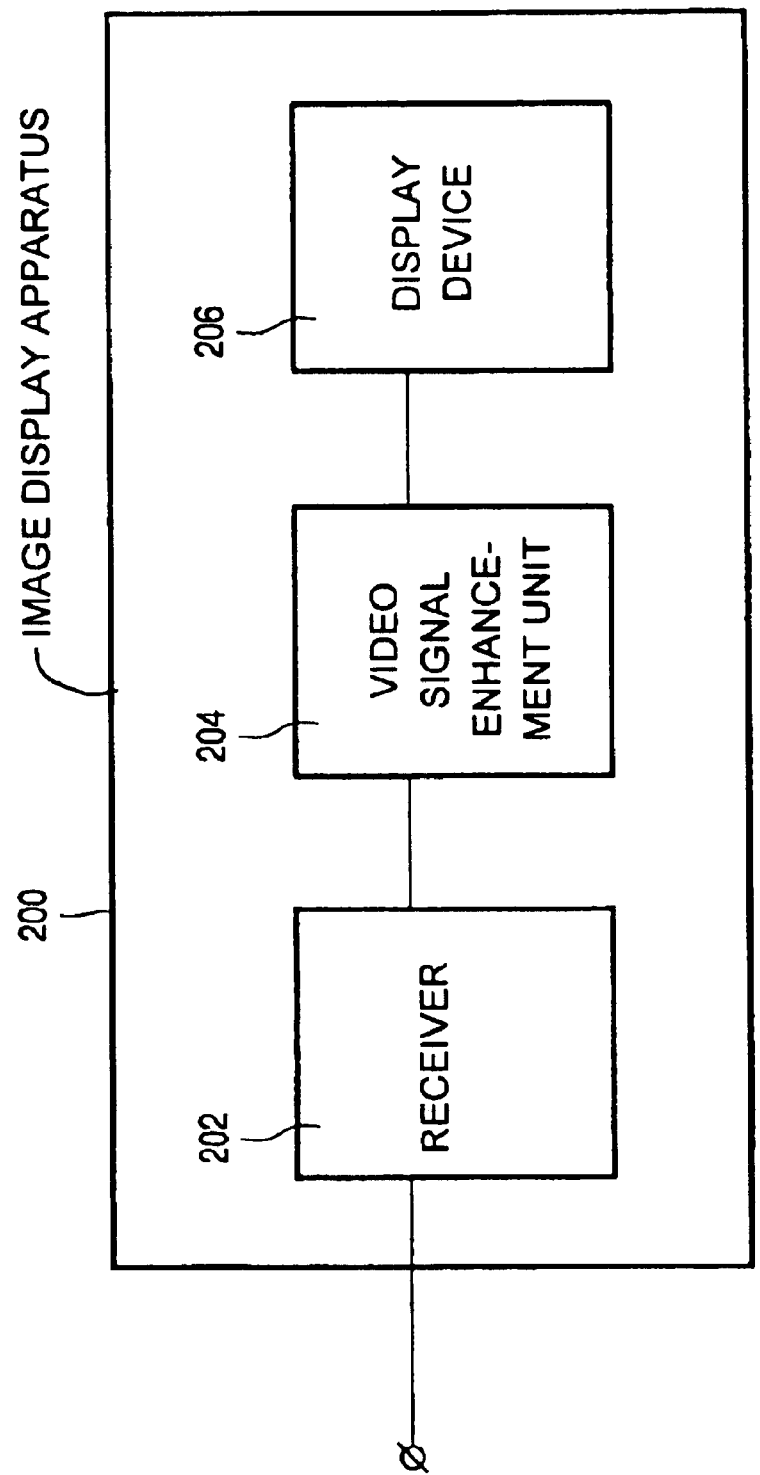
FIG. 2 shows elements of an image display apparatus.

FIG. 2 shows elements of an image display apparatus 200 according to the invention. The image display apparatus 200 has a receiving means 202 for receiving a video signal representing the images to be displayed. The signal may be a broadcast signal received via an antenna or cable, but may also be a signal from a storage device, like a VCR (Video Cassette Recorder) or DVD (Digital Versatile Disk). The data may be conform to a digital standard, like DVI (Digital Visual Interface). The image display apparatus 200 further has a video signal enhancement unit 204 for processing the video signal, and a display device 206 for displaying the images represented by the processed video signal. The video signal enhancement unit 204 is implemented as described in FIG. 1.

Figure 3:
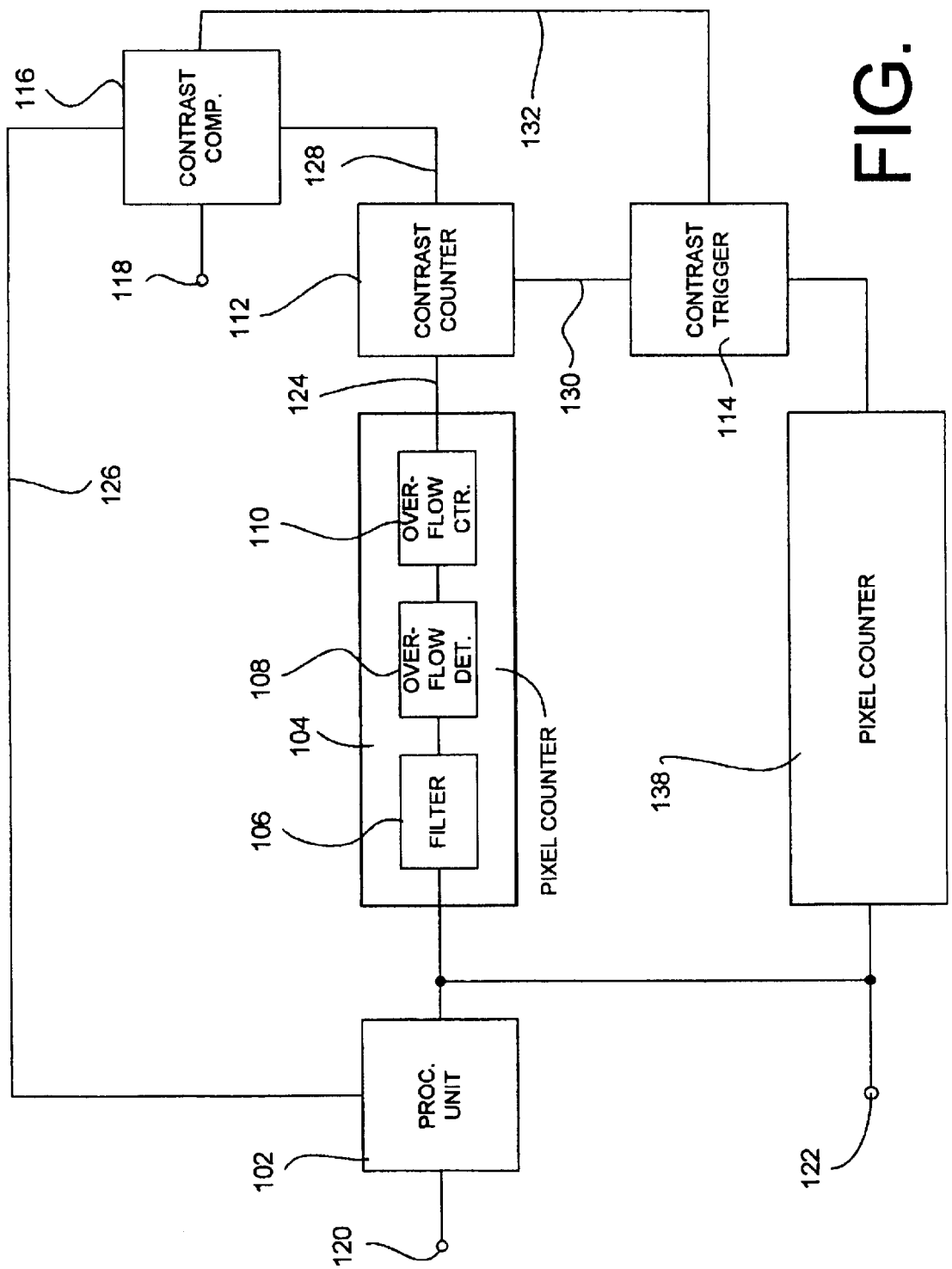
FIG. 3 schematically shows another embodiment of the video signal enhancement unit.

FIG. 3 shows an alternate embodiment of the video signal enhancement unit shown in FIG. 1. In particular, instead of receiving the vertical synchronizing signal FS, the trigger means 114 receives a control signal from a second pixel counter 138 substantially similar to the pixel counter 104. The second pixel counter 138 receives the modified video signal on output 122, and generates a trigger signal for the trigger means each time that a second count of pixels, representative of a second number of pixels which have video signal levels higher than a second predetermined video level, is less than a second predefined threshold. This means that the generation of contrast increase pulses is conditional. The second predetermined video level is typically 5–10% less than the first predetermined video level.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the apparatus claims enumerating several means, several of these means can be embodied by one and the same item of hardware.

What is claimed is:

1. A video signal enhancement unit comprising:
    a pixel counter for generating a count of pixels representative of the number of pixels that have video signal levels higher than a predetermined video level;
    a processing unit for modifying contrast of the video signal in dependence on the count of pixels;
        a contrast counter for providing control input for the processing unit, said contrast counter storing a contrast count that is decreased each time the count of pixels exceeds a predefined threshold; and
        a trigger means, coupled to the contrast counter, for generating a pulse resulting in an increase of the contrast count.

2. The video signal enhancement unit as claimed in claim 1, characterized in that the trigger means generates the pulse every video field.

3. The video signal enhancement unit as claimed in claim 1, characterized in that said video signal enhancement unit further comprises a second pixel counter, substantially similar to said pixel counter, for generating a second count of pixels representative of a second number of pixels that have video signal levels higher than a second predetermined video level, the trigger means generating the pulse if the second count of pixels is less than a second predefined threshold.

4. The video signal enhancement unit as claimed in claim 1, characterized in that said video signal enhancement unit further comprises a contrast comparator coupled to the contrast counter, said contrast comparator limiting the contrast count to a maximum contrast value.

5. The video signal enhancement unit as claimed in claim 4, characterized in that the maximum contrast value is controllable.

6. The video signal enhancement unit as claimed in claim 4, characterized in that the contrast comparator controls the trigger means to stop generating pulses when the contrast count has reached the maximum contrast value.

7. An image display apparatus comprising:

receiving means for receiving a video signal;

a display device for displaying images represented by the video signal; and a video signal enhancement unit comprising:

a pixel counter for generating a count of pixels representative of the number of pixels that have video signal levels higher than a predetermined video level;

a processing unit for modifying contrast of the video signal in dependence on the pixel count;

a contrast counter for providing a control input for the processing unit and for storing a contrast count that is decreased each time the count of pixels exceeds a predefined threshold; and a trigger means, coupled to the contrast counter, for generating a pulse resulting in an increase of the contrast count.

8. The image display apparatus as claimed in claim 7, characterized in that the trigger means generates a pulse every video field.

9. The image display apparatus as claimed in claim 7, characterized in that the video signal enhancement unit further comprises a contrast comparator coupled to the contrast counter, said contrast comparator limiting the contrast count to a maximum contrast value.

10. A method of video signal enhancement comprising the steps:

generating a count of pixels representative of the number of pixels in the video signal that have video signal levels higher than a predetermined video level;

modifying contrast of the video signal in dependence on contrast count;

storing the contrast count, and decreasing the stored contrast count each time the count of pixels exceeds a predefined threshold; and increasing the contrast count in response to a trigger pulse.

* * * * *